US012794644B2

(12) United States Patent
Li et al.

(10) Patent No.: US 12,794,644 B2
(45) Date of Patent: Nov. 10, 2026

(54) METHODS AND APPARATUS OF INDICATING STATES OF AVAILABILITY OF TRS RESOURCES

(71) Applicant: Lenovo (Beijing) Limited, Beijing (CN)

(72) Inventors: Yingying Li, Beijing (CN); Zhi Yan, Beijing (CN); Yuantao Zhang, Beijing (CN); Hongmei Liu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 302 days.

(21) Appl. No.: 18/693,639

(22) PCT Filed: Sep. 30, 2021

(86) PCT No.: PCT/CN2021/122214

§ 371 (c)(1),
(2) Date: Mar. 20, 2024

(87) PCT Pub. No.: WO2023/050327

PCT Pub. Date: Apr. 6, 2023

(65) Prior Publication Data

US 2025/0141620 A1 May 1, 2025

(51) Int. Cl.
*H04L 5/00* (2006.01)

(52) U.S. Cl.
CPC ............ *H04L 5/0053* (2013.01); *H04L 5/005* (2013.01); *H04L 5/0094* (2013.01)

(58) Field of Classification Search
CPC ...... H04L 5/005; H04L 5/0053; H04L 5/0094
See application file for complete search history.

(56) References Cited

U.S. PATENT DOCUMENTS

2021/0288773 A1 9/2021 Lin et al.
2022/0271878 A1* 8/2022 Lin ...................... H04W 68/02

(Continued)

FOREIGN PATENT DOCUMENTS

CN 113056951 A 6/2021

OTHER PUBLICATIONS

Ericsson , "Provisioning of TRS occasions to Idle/Inactive UEs", 3GPP TSG RAN WG1 #105-e, Tdoc R1-2105792, e-meeting, retrieved from the internet on Jun. 9, 2024, <https://www.3gpp.org/ftp/tsg_ran/WG1_RL1/TSGR1_105-e/Docs>, May 10, 2021, 12 pages.

(Continued)

*Primary Examiner* — Michael K Phillips
(74) *Attorney, Agent, or Firm* — FIG. 1 Patents

(57) ABSTRACT

Methods and apparatus of indicating states of availability of Tracking Reference Signal (TRS) resources are disclosed. The method includes: receiving, by a receiver, a first signaling indicating states of availability of Tracking Reference Signal (TRS) resource groups in a first set of TRS resource groups, a second signaling indicating states of availability of TRS resource groups in a second set of TRS resource groups; and determining, by a processor, availability of TRS resources based on the first signaling and the second signaling; wherein each of the first signaling and the second signaling is one of: a paging Physical Downlink Control Channel (PDCCH) based signaling and a Paging Early Indication (PEI) based signaling.

20 Claims, 6 Drawing Sheets

(56) References Cited

U.S. PATENT DOCUMENTS

| | | | | |
|---|---|---|---|---|
| 2023/0051117 A1* | 2/2023 | Tsai | ...................... | H04L 5/0048 |
| 2024/0098697 A1* | 3/2024 | Peng | ................... | H04W 72/232 |
| 2024/0163846 A1* | 5/2024 | Sheng | ................. | H04W 68/025 |
| 2024/0381307 A1* | 11/2024 | Reial | ................... | H04W 68/005 |

OTHER PUBLICATIONS

Ericsson , "Provisioning of TRS occasions to Idle/Inactive UEs", 3GPP TSG RAN WG1 #106-e, R1-2107999, e-meeting, retrieved from the internet on Jun. 9, 2024, <https://www.3gpp.org/ftp/tsg_ran/WG1_RL1/TSGR1_106-e/Docs>, Aug. 16, 2021, 12 pages.

PCT/CN2021/122214 , "International Preliminary Report on Patentability", International Application No. PCT/ CN2021/122214, Apr. 2, 2024, 4 pages.

PCT/CN2021/122214 , "International Search Report and Written Opinion", International Application No. PCT/ CN2021/122214, Jun. 27, 2022, 7 pages.

ZTE , "TRS for RRC idle and inactive UEs", 3GPP TSG RAN WG1 #105-e, R1-2104222, e-meeting, retrieved from the internet on Jun. 9, 2024, <https://www.3gpp.org/ftp/tsg_ran/WG1_RL1/TSGR1_105-e/Docs>, May 10, 2021, 6 pages.

ZTE Corporation , "TRS for RRC idle and inactive UEs", 3GPP TSG RAN WG1 #106-e, R1-2106522, e-meeting, retrieved from the internet on Jun. 9, 2024, <https://www.3gpp.org/ftp/tsg_ran/WG1_RL1/TSGR1_106-e/Docs>, Aug. 16, 2021, 7 pages.

* cited by examiner

METHODS AND APPARATUS OF INDICATING STATES OF AVAILABILITY OF TRS RESOURCES

FIELD

The subject matter disclosed herein relates generally to wireless communication and more particularly relates to, but not limited to, methods and apparatus of idle or inactive mode Tracking Reference Signal (TRS) resource availability indication with different granularity.

BACKGROUND

The following abbreviations and acronyms are herewith defined, at least some of which are referred to within the specification:

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Cyclic redundancy check (CRC), Channel State Information (CSI), Channel State Information Reference Signal (CSI-RS), Downlink Control Information (DCI), Frequency Division Multiple Access (FDMA), Index/Identifier (ID), Information Element (IE), Paging Occasion (PO), Physical Resource Block (PRB), Radio Network Temporary Identifier (RNTI), Reference Signal (RS), Transmission and Reception Point (TRP), Broadcast Control Channel (BCCH), Frequency Range 1 (FR1), Frequency Range 2 (FR2), Paging RNTI (P-RNTI), System Information Block (SIB), Tracking Reference Signal (TRS), Commercial Mobile Alert Service (CMAS), Earthquake and Tsunami Warning System (ETWS), Layer 1/physical layer (L1), Quasi Co-Location (QCL), Paging Early Indication (PEI).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

NR supports RRC_INACTIVE state or RRC_IDLE state, and UEs with infrequent (periodic and/or non-periodic) data transmission are generally maintained by the network in the RRC_INACTIVE state or RRC_IDLE state.

SUMMARY

Methods and apparatus of indicating states of availability of Tracking Reference Signal (TRS) resources with different granularity are disclosed.

According to a first aspect, there is provided a method, including: receiving, by a receiver, a first signaling indicating states of availability of Tracking Reference Signal (TRS) resource groups in a first set of TRS resource groups; receiving, by the receiver, a second signaling indicating states of availability of TRS resource groups in a second set of TRS resource groups; and determining, by a processor, availability of TRS resources based on the first signaling and the second signaling; wherein each of the first signaling and the second signaling is one of: a paging Physical Downlink Control Channel (PDCCH) based signaling and a Paging Early Indication (PEI) based signaling.

According to a second aspect, there is provided a method, including: transmitting, by a transmitter, a first signaling indicating states of availability of Tracking Reference Signal (TRS) resource groups in a first set of TRS resource groups; transmitting, by the transmitter, a second signaling indicating states of availability of TRS resource groups in a second set of TRS resource groups; and determining, by a processor, availability of TRS resources based on the first signaling and the second signaling; wherein each of the first signaling and the second signaling is one of: a paging Physical Downlink Control Channel (PDCCH) based signaling and a Paging Early Indication (PEI) based signaling.

According to a third aspect, there is provided an apparatus, including: a receiver that receives a first signaling indicating states of availability of Tracking Reference Signal (TRS) resource groups in a first set of TRS resource groups; and a second signaling indicating states of availability of TRS resource groups in a second set of TRS resource groups; and a processor that determines availability of TRS resources based on the first signaling and the second signaling; wherein each of the first signaling and the second signaling is one of: a paging Physical Downlink Control Channel (PDCCH) based signaling and a Paging Early Indication (PEI) based signaling.

According to a fourth aspect, there is provided an apparatus, including: a transmitter that transmits a first signaling indicating states of availability of Tracking Reference Signal (TRS) resource groups in a first set of TRS resource groups; and a second signaling indicating states of availability of TRS resource groups in a second set of TRS resource groups; and a processor that determines availability of TRS resources based on the first signaling and the second signaling; wherein each of the first signaling and the second signaling is one of: a paging Physical Downlink Control Channel (PDCCH) based signaling and a Paging Early Indication (PEI) based signaling.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
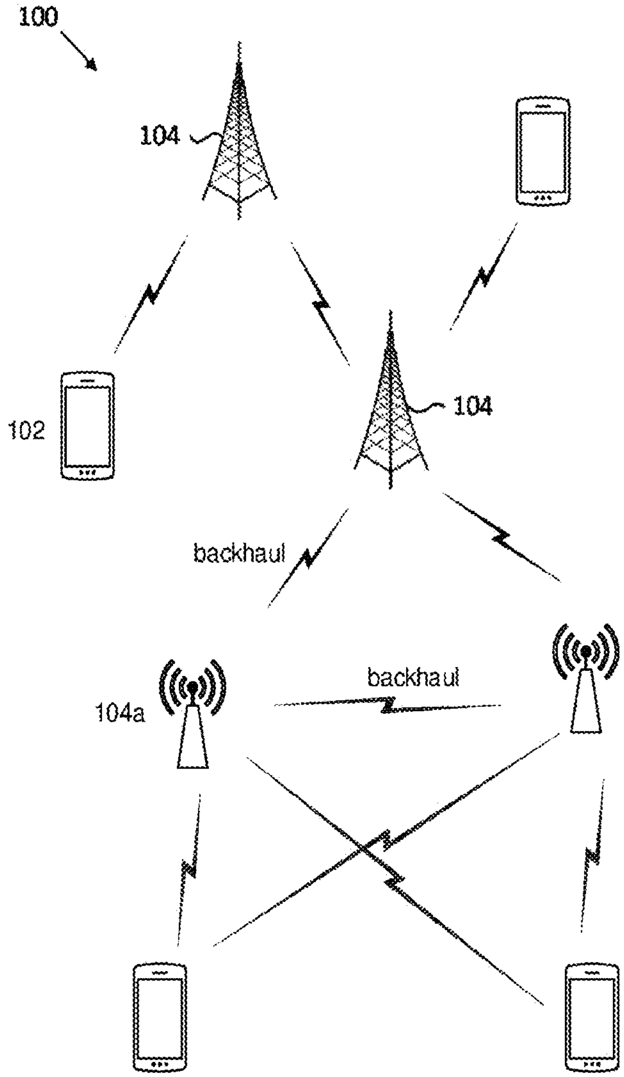
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102*a*, 102*b*, 102*c*, and 102*d*, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104*a*. In some embodiments, the network equipment may be a gNB 104 that controls a number of TRPs 104*a*. In addition, there is a backhaul between two TRPs 104*a*. In some other embodiments, the network equipment may be a TRP 104*a* that is controlled by a gNB.

Communication links are provided between the NEs 104, 104*a* and the UEs 102, 102*a*, respectively, which, for example, may be NR UL/DL communication links. Some UEs 102, 102*a* may simultaneously communicate with different Radio Access Technologies (RATs), such as NR and LTE.

In some embodiments, the UE 102*a* may be able to communicate with two or more TRPs 104*a* that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
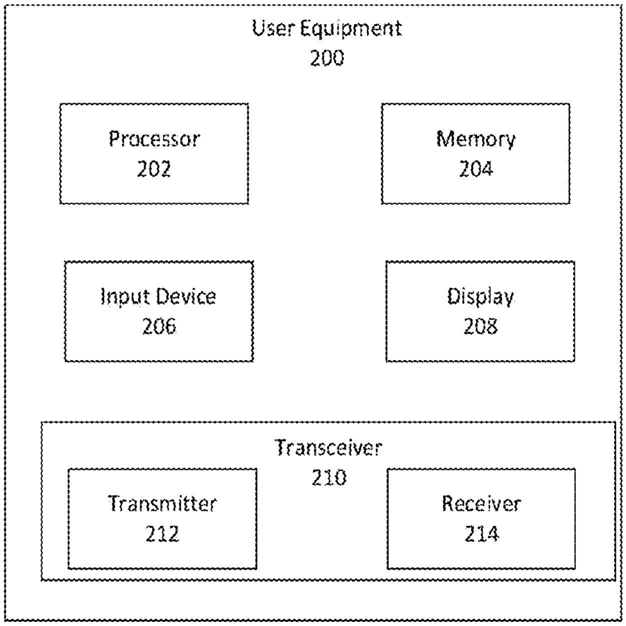
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
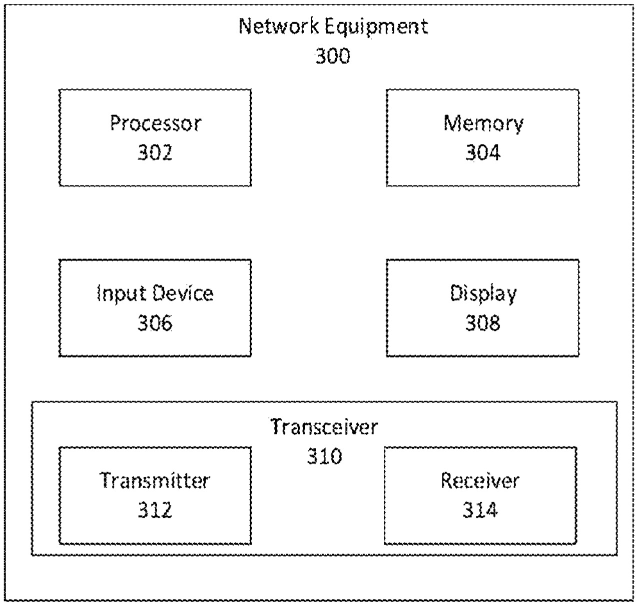
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

For a cell with TRS/CSI-RS occasions configured for IDLE/Inactive UEs, IDLE/Inactive UE's assumption on the availability of TRS/CSI-RS at the configured occasion(s) is informed to the idle/inactive UE based on explicit indication. The idle/inactive UE can assume that TRS/CSI-RS at the configured occasion(s) is TRS. TRS in the disclosure indicates TRS/CSI-RS at the configured occasion(s) to the idle/inactive UEs.

Working assumptions include to support paging PDCCH based availability indication of TRS/CSI-RS occasions for idle/inactive UEs; and to support PEI based availability indication of TRS/CSI-RS occasions for idle/inactive UEs.

Accordingly, TRS availability may be indicated in PEI and/or paging PDCCH. From network perspective, availability of TRS may be transmitted in both paging PDCCH based availability indication and PEI based availability indication. For PEI-enabled UE, the UE may receive TRS availability indication twice, in PEI and in paging PDCCH, separately.

Figure 4:
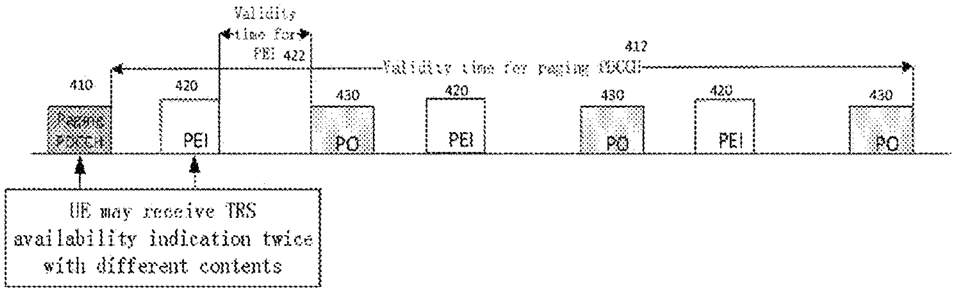
FIG. 4 is a schematic diagram illustrating an example of TRS availability with different validity time and different granularity in accordance with some implementations of the present disclosure.

L1 based availability indication of TRS/CSI-RS at the configured occasion(s) to the idle/inactive UEs is valid for a time duration (i.e., valid time) starting from a reference point. The valid time duration for paging PDCCH and PEI based availability indication may have different definitions. FIG. 4 is a schematic diagram illustrating an example of TRS availability with different validity time and different granularity in accordance with some implementations of the present disclosure. As shown in FIG. 4, the UE may receive TRS availably indication twice with different contents, i.e., one in paging PDDCCH 410, and another in PEI 420. The validity time for paging PDCCH based availability indication 412 is different from the validity time for PEI based availability indication 422.

In addition, there may be inconsistency in the contents of the L1 based availability indication in PEI and paging PDCCH. For paging PDCCH based TRS availability indication, at most 6 bits reserved in DCI format 1_0 with CRC scrambled by P-RNTI and further 5 bits reserved in Short Message (bits 4-8) shown in Table 1 and Table 2 below can be used. The design of PEI may have the bit number (or number of bits) used for TRS availability indication different from that in the paging PDCCH.

TABLE 1

DCI format 1_0 with CRC scrambled by P-RNTI in Release 16

| Field (Item) | Bits |
|---|---|
| Short Message Indicator | 2 |
| Short Messages | 8 |
| Frequency domain resource assignment | Variable |
| Time domain resource assignment | 4 |
| VRB-to-PRB mapping | 1 |
| Modulation and coding scheme | 5 |
| TB Scaling | 2 |
| Reserved | 6 |

TABLE 2

Short Message in NR Release 16

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

From network perspective, availability of TRS may be transmitted in both paging PDCCH and PEI based availability indication. PEI-disabled UE may receive TRS availability indication only in paging PDCCH. PEI-enabled UE may receive TRS availability indication twice, in PEI and paging PDCCH, separately.

The contents in PEI and paging PDCCH (which may also be referred to as paging DCI) may be different, for example, because of the different bit numbers used for TRS availability indication (i.e., different granularity). This inconsistency in the contents of the L1 indicator of PEI and paging PDCCH should be addressed. For the case of PEI and paging PDCCH carrying TRS availability indication with different granularity, the L1 based availability indication with coarse granularity may cause more resource overhead with unreasonable grouping.

In the disclosure, designs for indicating the TRS availability with the different contents (i.e., different granularity) are proposed, and UE behavior of receiving TRS availability indication are specified.

The TRS resources may be grouped into groups (e.g. TRS resources groups or TRS groups) for indication of state of availability by the paging PDCCH or PEI. A reference to a TRS resource may also be a reference to a TRS resource set, as defined in the 3GPP Technical Specification TS 38.331 for example. In that case, each TRS group may comprise a number of TRS resource sets. Different methods or schemes of grouping may be used. The grouping methods may include, grouping TRS with same QCL (or same beam as indicated by an SSB index specified in specification documents of the 3GPP), grouping based on predefined rules, grouping by higher layer, or other suitable grouping methods.

Indication with Different Granularity

The paging PDCCH based availability indication and the PEI based availability indication may be applied to TRS resources groups that are grouped based on the same or different grouping methods.

In some examples, different grouping methods, with different granularities, are used for indication of states of availability by the paging PDCCH or PEI. The indication needs to be correctly interpreted by the UE. Several potential solutions, or options, are proposed.

Informing UE of the Availability of a Part of the TRS Groups

In an example, the UE may be informed of the availability of only a part of the TRS groups by one of the PEI and paging PDCCH based availability indications, which has coarse granularity.

TRS are grouped based on the TRS group number for the L1 based availability indication with finer granularity. In the example, the TRS grouping method is not changed for L1 based availability indication with different granularities (i.e., different numbers of bits are used for TRS availability indication).

The L1 based availability indication with coarse granularity (i.e., less bit number for TRS availability indication) may inform UE of the availability of a part of the TRS groups. The part of the TRS groups may be the TRS groups with the smallest resource group IDs.

Figure 5:
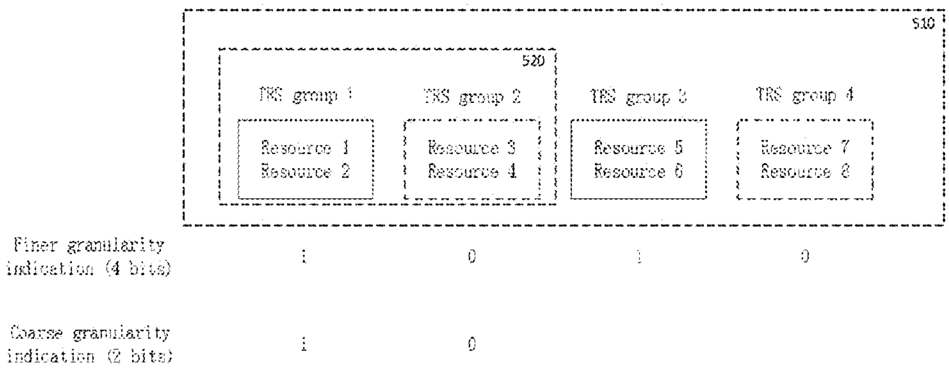
FIG. 5 is a schematic diagram illustrating an example of informing UE of the availability of part of the TRS groups in accordance with some implementations of the present disclosure.

FIG. 5 is a schematic diagram illustrating an example of informing UE of the availability of part of the TRS groups in accordance with some implementations of the present disclosure. In FIG. 5, the TRS group number for the L1 based availability indication with finer granularity is 4 (i.e., the TRS availability is indicated by 4 bits). Eight TRS resources 1-8 are grouped into 4 groups (i.e., TRS group 1, 2, 3, 4). In this example, 4 bits in the L1 based availability indication with finer granularity correspond to TRS group 1, 2, 3 and 4 (510 in FIG. 5), respectively. 2 bits in the L1 based availability indication with coarse granularity correspond to TRS groups 1 and 2 (520 in FIG. 5), respectively. This will not bring unnecessary overhead to network.

Configuring Two Group Structures for TRS Resources

In another example, two group structures for TRS resources may be configured, each corresponding to one of the PEI and paging PDCCH based availability indications.

In the example, higher layer may configure two TRS group numbers (e.g., a first number of groups and a second number of groups) for the two L1 based availability indications (e.g. paging PDCCH, PEI), respectively; and the TRS resources are grouped into two group structures based on the two configured TRS group numbers. Paging PDCCH based availability indication may correspond to the TRS groups in a first group structure; and PEI based availability indication may correspond the TRS groups in a second group structure.

In other words, the TRS resources may be grouped into a first number of groups forming the first set of TRS resource groups (or the first group structure), and are grouped into a second number of groups forming the second set of TRS resource groups (or the second group structure), the second number of groups being different from the first number of groups.

In some examples, higher layer may configure the group IDs in the TRS configuration.

In an embodiment, two new parameters, group ID 1 for paging PDCCH based availability indication and group ID 2 for PEI based availability indication, may be introduced in information element (IE) of the CSI-RS resource/resource set. An example of the information element (IE) is shown below.

```
TRS-Resource ::=            SEQUENCE {
  powerControlOffsetSS        ENUMERATED{db-3, db0, db3, db6}
OPTIONAL, -- Need R
  scramblingID                ScramblingId,
  groupID1                    GroupID1
  groupID2                    GroupID2
  ...
}
```

The UE, when receiving the paging PDCCH based availability indication, may assume that a TRS belongs to a TRS group with group ID as groupID1. The UE, when receiving PEI based availability indication, may assume that a TRS belongs to a TRS group with group ID as groupID2.

In some other examples, higher layer may configure the TRS group structure containing the TRS resource ID.

Figure 6A:
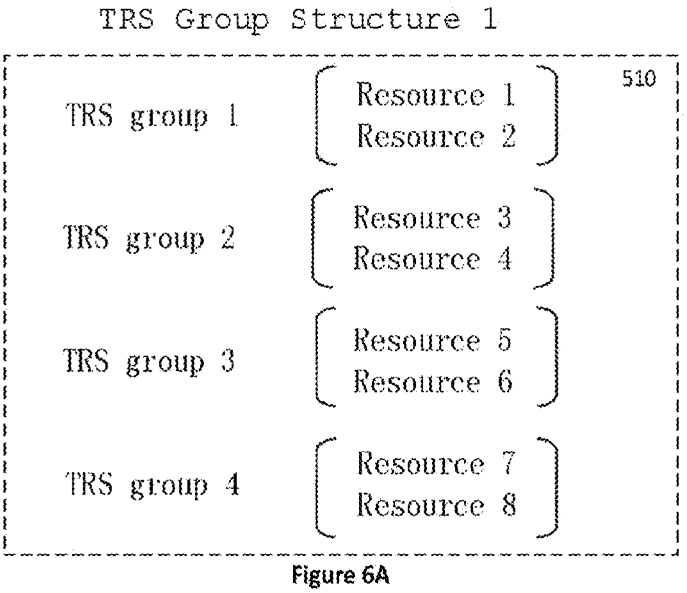
FIG. 6A is a schematic diagram illustrating an example of TRS group structure 1 configured by higher layer in accordance with some implementations of the present disclosure.

FIG. 6A is a schematic diagram illustrating an example of TRS group structure 1 configured by higher layer in accordance with some implementations of the present disclosure.

Figure 6B:
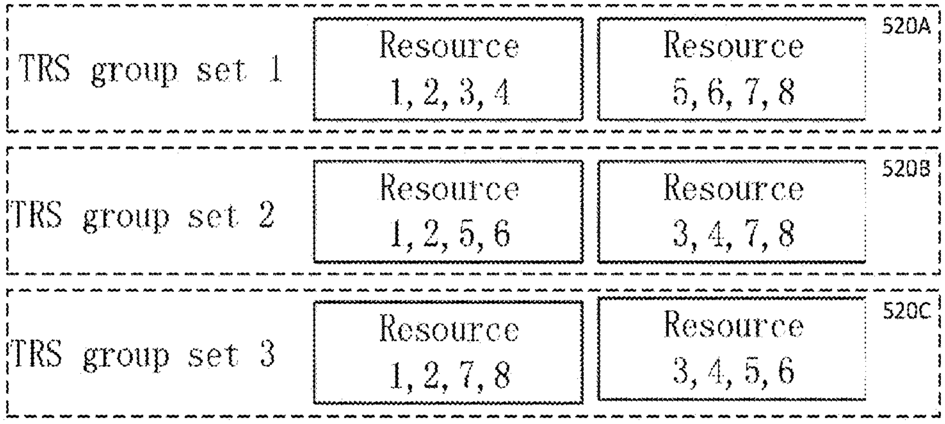
FIG. 6B is a schematic diagram illustrating examples of TRS group set for TRS group structure 2 in accordance with some implementations of the present disclosure.

FIG. 6B is a schematic diagram illustrating examples of TRS group set for TRS group structure 2 in accordance with some implementations of the present disclosure.

In an embodiment, the group number in TRS group structure 1 510 is the configured TRS group number for paging PDCCH based availability indication, as shown in FIG. 6A. For example, resource 1 (TRS resource 1) and resource 2 (TRS resource 2) are grouped into TRS resource group 1 in TRS group structure 1 510.

The group number in TRS group structure 2 (520A, 520B or 520C) is the configured TRS group number for PEI based availability indication, as shown in FIG. 6B. The TRS group structure 2 includes two TRS groups. Configured by higher layer, TRS group structure 2 may be the second TRS group structure 520A (or TRS group set 1) consisting of: a first group including resources 1, 2, 3, and 4; and a second group including resources 5, 6, 7, and 8. TRS group structure 2 may be the second TRS group structure 520B (or TRS group set 2) consisting of: a first group including resources 1, 2, 5, and 6; and a second group including resources 3, 4, 7, and 8. TRS group structure 2 may be the second TRS group structure 520C (or TRS group set 3) consisting of: a first group including resources 1, 2, 7, and 8; and a second group including resources 3, 4, 5, and 6. TRS group set 1, TRS group set 2, and TRS group set 3, are examples of the second TRS group structure, i.e. the second set of TRS resource groups.

The UE, when receiving the paging PDCCH based availability indication, may assume that TRS resources are grouped based on TRS group structure 1. The UE, when receiving PEI based availability indication, may assume that TRS resources are grouped based on TRS group structure 2.

Regrouping (Splitting/Merging) Based on Predefined Rules

It may be assumed that one L1 based availability indication is associated with TRS group number 1; and another L1 based availability indication is associated with TRS group number 2. That is, the TRS resources are grouped into a first number of groups forming the first set of TRS resource groups, and are grouped into a second number of groups forming the second set of TRS resource groups, the second number of groups being different from the first number of groups.

In some examples, the first set of TRS resource groups consists of a first number of groups; and the second set of TRS resource groups consists of a second number of groups. For example, a number of groups of the first set of TRS resource groups may refer to the total number of groups forming the first set of TRS resource groups.

TRS are grouped based on TRS group number 1 (or the first number of groups) into TRS group structure 1 (of the first set of TRS resource groups) for one L1 based availability indication.

In this example, the TRS resources are regrouped into TRS group structure 2 (of the second set of TRS resource groups) by splitting or merging the TRS groups in structure 1 (of the first set of TRS resource groups) for another L1 based availability indication.

Figure 7A:
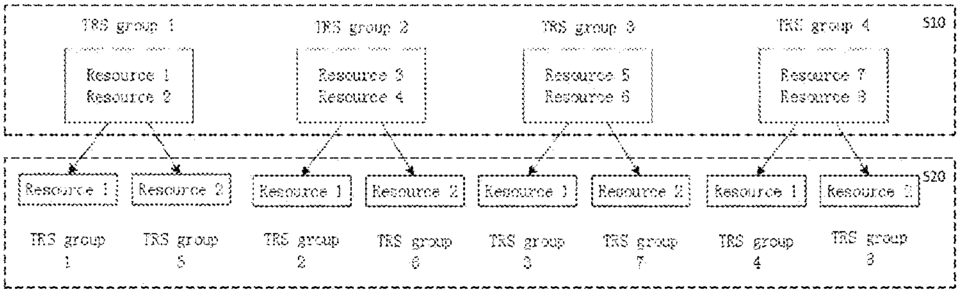
FIG. 7A is a schematic diagram illustrating an example of splitting TRS group in ascending order of group ID in accordance with some implementations of the present disclosure.

FIG. 7A is a schematic diagram illustrating an example of splitting TRS group in ascending order of group ID in accordance with some implementations of the present disclosure.

If TRS group number 2 (for TRS group structure 2) is larger than TRS group number 1 (for TRS group structure 1), TRS groups may be split in ascending order of group ID until the required group number is reached (i.e., equal to TRS group number 2).

The group IDs of the new groups may be implicitly calculated instead of configured. The group IDs of the new groups that are formed by splitting are determined at least by the group ID of the group that has been split (which may be referred to as the split group), TRS group number 1, and TRS group number 2.

In some examples, a splitting factor M may be defined as:

$$M = \text{group number 2} / \text{group number 1}.$$

In some examples, the group ID of the new group (in the second set of TRS resource groups) may be obtained by:

group ID of the split TRS group+TRS group number 1*m, where 0<=m<=M−1.

As shown in FIG. 7A for example, there are four groups in the first set of the TRS resource groups 510, i.e., group number 1 is 4; and there are eight groups in the second set of the TRS resource groups 520, i.e., group number 2 is 8. The splitting fact M is equal to 2 (i.e. 8/4). Thus, in this example, the value of m may be 0 or 1.

The TRS resources are grouped into TRS group structure 1 with 4 TRS groups. The TRS groups in TRS group structure 1 are split to get a TRS group structure 2 with 8 TRS groups.

For example, the group IDs of two new groups of the second set of TRS resource groups 520, from splitting TRS group 1 of the first set of TRS resource groups 510, may be calculated using the above formula as:

$$1 + 4 * 0 = 1,$$

$$\text{where}$$

$$m = 0,$$

$$\text{and}$$

$$1 + 4 * 1 = 5,$$

$$\text{where}$$

$$m = 1.$$

Similarly, the group IDs of two new groups of the second set of TRS resource groups 520, from splitting TRS group 2 of the first set of TRS resource groups 510, may be calculated using the above formula as:

$$2+4*0=2,$$

where $$m=0,$$

and $$2+4*1=6,$$

where $$m=1;$$

and so on.

Figure 7B:
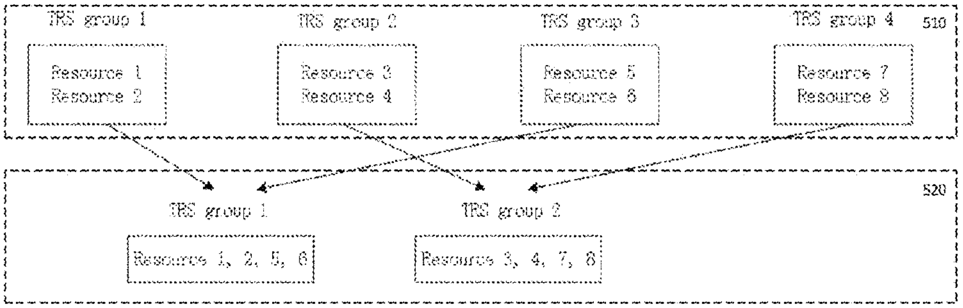
FIG. 7B is a schematic diagram illustrating an example of merging TRS groups in accordance with some implementations of the present disclosure.

FIG. 7B is a schematic diagram illustrating an example of merging TRS groups in accordance with some implementations of the present disclosure.

If TRS group number 2 is less than TRS group number 1, the TRS groups with group index satisfying the following condition may be merged.

If group ID 1% N=group ID 2% N, TRS group with group ID 1 and TRS group with group ID 2 are merged. N is TRS group number 2.

That is, TRS resource groups of the first set of TRS resource groups with group ID 1 and group ID 2 are merged upon satisfying the condition of:

$$\text{group } ID\ 1\%\ N = \text{group } ID\ 2\%\ N,$$

where N is a number of groups of the second set of TRS resource groups, and % represents modulo operation.

The group IDs of the new groups may be implicitly calculated instead of configured. The group IDs of the new groups (in the second set of TRS resource groups) may be determined at least by the smallest group ID of the group used to merge, i.e., New group ID=minimum {group ID 1, group ID 2}.

In the example as shown in FIG. 7B, there are four groups in the first set of TRS resource groups 510, i.e., group number 1 is 4; and there are two groups in the second set of the TRS resource groups 520, i.e., group number 2 is 2. The TRS resources are grouped into TRS group structure 1 with 4 TRS groups. The TRS resource groups in TRS group structure 1 are merged to get a TRS group structure 2 with 2 TRS groups in the second set of the TRS resource groups 520.

For example, the group ID of the first new group of the second set of TRS resource groups 520, from merging TRS group 1 and TRS group 3 of the first set of TRS resource groups 510, may be calculated using the above formula as:

Minimum (1, 3)=1.

Similarly, the group ID of the second new group of the second set of TRS resource groups 520, from merging TRS group 2 and TRS group 4 of the first set of TRS resource groups 510, may be calculated using the above formula as:

Minimum (2, 4)=2.

UE Behavior on Receiving TRS Availability Indication

UE may receive TRS availability indication twice, once in PEI and once in paging PDCCH, separately. The paging PDCCH based availability indication and PEI based availability indication may indicate the same or different states/contents of TRS availability.

In some examples, the paging PDCCH based availability indication may be referred to as the first signaling; and the PEI based availability indication may be referred as the second signaling. In some other examples, the PEI based availability indication may be referred as the first signaling the paging; and the PDCCH based availability indication may be referred to as the second signaling.

FIGS. 8A to 8D are schematic diagrams illustrating examples of UE behavior on receiving TRS availability indication in accordance with some implementations of the present disclosure.

In some examples, the UE may follow the detection of the latest indication.

Figure 8A:
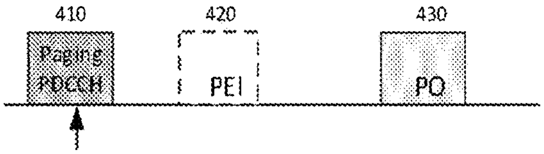
FIGS. 8A to 8D are schematic diagrams illustrating examples of UE behavior on receiving TRS availability indication in accordance with some implementations of the present disclosure.

For the cases that the UE does not detect PEI 420 (e.g., it missed the PEI or PEI is not transmitted because there is no need to monitor the following PO) as shown in FIG. 8A, the UE may follow the detection of paging PDCCH 410 based availability indication. In this case, the paging PDCCH 410 is determined as the latest one of the received signal, as the PEI may be either not transmitted by the gNB or not detected by the UE. Any TRS resource with state of availability indicated as available by the paging PDCCH is determined as available.

Figure 8B:
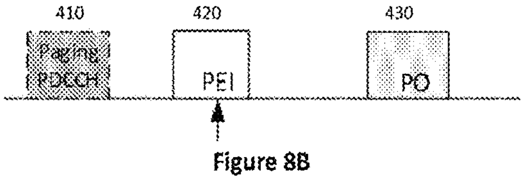
Figure 8C:
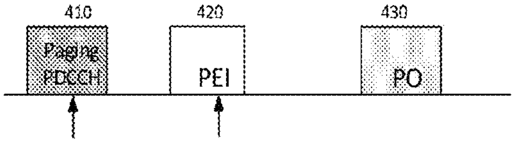

If the UE detects the PEI 420 as shown in FIG. 8B (where the paging PDCCH 410 has not been detected) and 8C (where the paging PDCCH 410 has been received), no matter whether the UE detects the paging PDCCH 410 or not, the UE may follow the detection of PEI 420 based availability indication. That is, the PEI 420 is determined as the latest one of the received signal. Any TRS resource with state of availability indicated as available by the PEI 420 is determined as available.

In some examples, the UE may assume that the TRS resources with state of availability indicated as available by paging PDCCH and PEI are both available. In this case, a TRS resource with state of availability indicated as available by any one of the paging PDCCH 410 and the PEI 420 is determined as available, irrespective of whether it is indicated as available or unavailable by the other one of the paging PDCCH and the PEI. For example, the TRS resource was indicated as available by the paging PDCCH, and was indicated as unavailable by the PEI, or vice versa, and in this case, the TRS resource would be determined as available.

In some other examples, availability indication by one of the signaling with finer granularity may be treated as valid, whether it is paging PDCCH based or PEI based. That is, the indication with coarse granularity may be disregarded or ignored. In some yet further examples, availability indication by one of the signaling with respect to all beams may be treated as valid, or availability indication by one of the signaling with respect to one beam that is the same as the signaling, may be treated as valid.

Figure 8D:
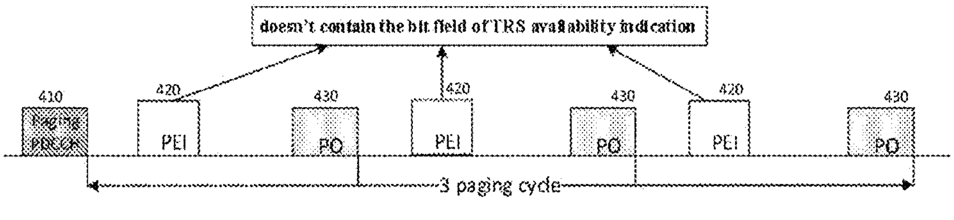

In some examples as shown in FIG. 8D, the PEI in the validity time of paging PDCCH 410 based availability indication may not contain the bit field of TRS availability indication. In this example, the validity time of the paging PDCCH 410 is three paging cycles, including 3 POs 430. Within this validity time, it may be assumed that the PEI signaling 420 contains no field of TRS availability indication.

Figure 9:
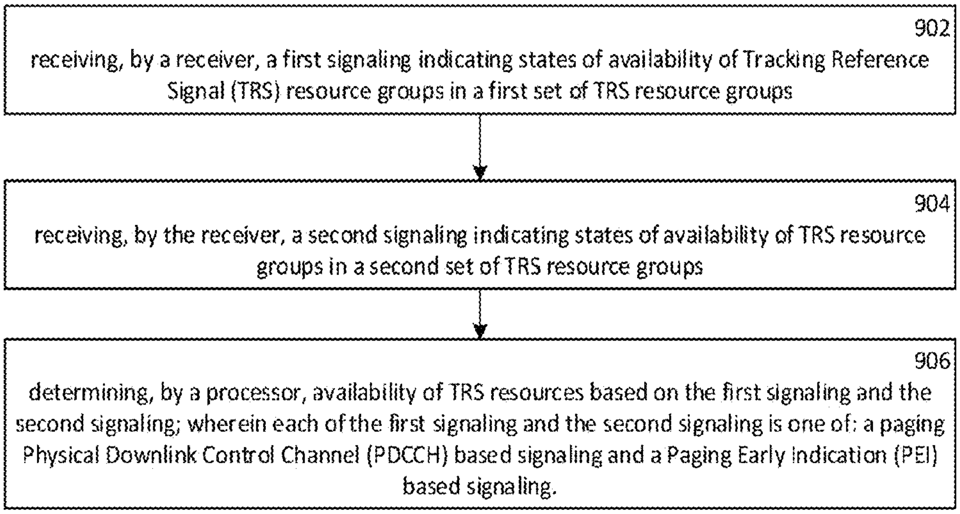
FIG. 9 is a flow chart illustrating steps of receiving indication of states of availability of Tracking Reference Signal (TRS) resource groups with different granularity by UE in accordance with some implementations of the present disclosure.

FIG. 9 is a flow chart illustrating steps of receiving indication of states of availability of Tracking Reference Signal (TRS) resource groups with different granularity by UE 200 in accordance with some implementations of the present disclosure.

At step 902, the receiver 214 of UE 200 receives a first signaling indicating states of availability of TRS resource groups in a first set of Tracking Reference Signal (TRS) resource groups.

At step 904, the receiver 214 of UE 200 receives a second signaling indicating states of availability of TRS resource groups in a second set of TRS resource groups.

Figure 10:
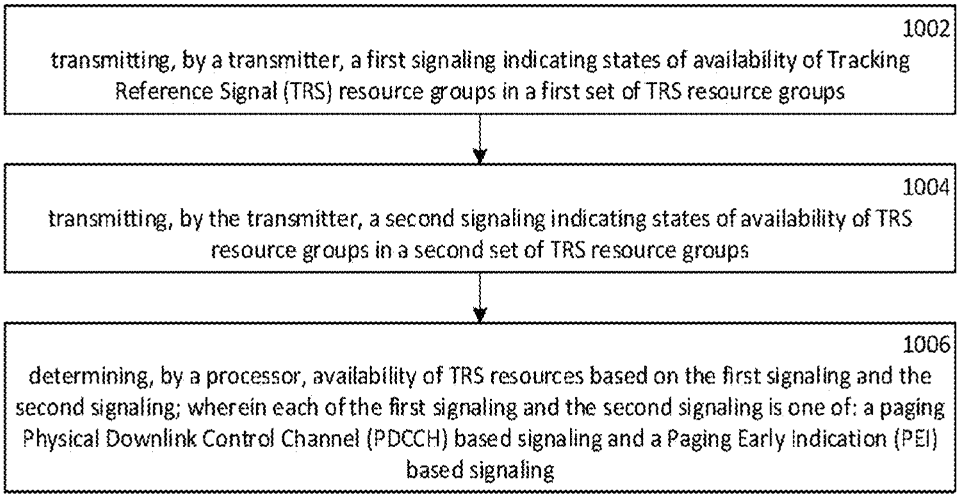
FIG. 10 is a flow chart illustrating steps of transmitting indication of states of availability of Tracking Reference Signal (TRS) resource groups with different granularity by gNB in accordance with some implementations of the present disclosure.

As step 906, the processor 202 of UE 200 determines availability of TRS resources based on the first signaling and the second signaling; wherein each of the first signaling and the second signaling is one of: a paging Physical Downlink Control Channel (PDCCH) based signaling and a Paging Early Indication (PEI) based signaling FIG. 10 is a flow chart illustrating steps of transmitting indication of states of availability of Tracking Reference Signal (TRS) resource groups with different granularity by gNB or NE 300 in accordance with some implementations of the present disclosure.

At step 1002, the transmitter 312 of NE 300 transmits a first signaling indicating states of availability of TRS resource groups in a first set of Tracking Reference Signal (TRS) resource groups.

At step 1004, the transmitter 312 of NE 300 transmits a second signaling indicating states of availability of TRS resource groups in a second set of TRS resource groups.

At step 1006, the processor 302 of NE 300 determines availability of TRS resources based on the first signaling and the second signaling; wherein each of the first signaling and the second signaling is one of: a paging Physical Downlink Control Channel (PDCCH) based signaling and a Paging Early Indication (PEI) based signaling.

In one aspect, some items as examples of the disclosure concerning a method of a UE or remote device may be summarized as follows:

1. A method, comprising:

receiving, by a receiver, a first signaling indicating states of availability of Tracking Reference Signal (TRS) resource groups in a first set of TRS resource groups;

receiving, by the receiver, a second signaling indicating states of availability of TRS resource groups in a second set of TRS resource groups; and determining, by a processor, availability of TRS resources based on the first signaling and the second signaling;

wherein each of the first signaling and the second signaling is one of: a paging Physical Downlink Control Channel (PDCCH) based signaling and a Paging Early Indication (PEI) based signaling.

2. The method of item 1, wherein the second set of TRS resource groups is a proper subset of the first set of TRS resource groups.

3. The method of item 1, wherein the TRS resources are grouped into a first number of groups forming the first set of TRS resource groups, and are grouped into a second number of groups forming the second set of TRS resource groups, the second number of groups being different from the first number of groups.

4. The method of item 1, wherein the first and second sets of TRS resource groups are configured by higher layer.

5. The method of item 4, wherein the first and second sets of TRS resource groups are configured based on a first group index (ID) and a second group ID.

6. The method of item 1, wherein the first set of TRS resource groups is configured by higher layer; and the TRS resources are regrouped into the second set of TRS resource groups by splitting TRS resource groups of the first set of TRS resource groups.

7. The method of item 6, the first set of TRS resource groups are split in ascending order of group ID until the number of groups is equal to a number of groups of the second set of TRS resource groups.

8. The method of item 6, wherein a group ID of each TRS resource group of the second set of TRS resource groups is determined at least by: a group ID of corresponding TRS resource group of the first set of TRS resource groups, a number of groups of the first set of TRS resource groups, and a number of groups of the second set of TRS resource groups.

9. The method of item 1, wherein the first set of TRS resource groups is configured by higher layer; and the TRS resources are regrouped into the second set of TRS resource groups by merging TRS resource groups of the first set of TRS resource groups.

10. The method of item 9, wherein TRS resource groups of the first set of TRS resource groups with group ID 1 and group ID 2 are merged upon satisfying the condition of:

$$\text{group } ID\ 1\%\ N = \text{group } ID\ 2\%\ N,$$

where N is a number of groups of the second set of TRS resource groups, and % represents modulo operation.

11. The method of item 9, wherein a group ID of a merged group of groups with group ID 1 and group ID 2 for the second set of TRS resource groups is determined at least based on the group ID1 and/or group ID2.

12. The method of item 1, wherein a TRS resource with state of availability indicated as available by a latest one of the received first signaling and second signaling is determined as available.

13. The method of item 1, wherein a TRS resource with state of availability indicated as available by any one of the first signaling and second signaling is determined as available.

14. The method of item 1, wherein the first signaling is paging PDCCH based signaling with a first validity time; the second signaling is a PEI based signaling with a second validity time; and it is assumed that, within the first validity time, the PEI signaling contains no field of TRS availability indication.

In another aspect, some items as examples of the disclosure concerning a method of a NE or gNB may be summarized as follows:

15. A method, comprising:

transmitting, by a transmitter, a first signaling indicating states of availability of Tracking Reference Signal (TRS) resource groups in a first set of TRS resource groups;

transmitting, by the transmitter, a second signaling indicating states of availability of TRS resource groups in a second set of TRS resource groups; and determining, by a processor, availability of TRS resources based on the first signaling and the second signaling;

wherein each of the first signaling and the second signaling is one of: a paging Physical Downlink Control Channel (PDCCH) based signaling and a Paging Early Indication (PEI) based signaling.

16. The method of item 15, wherein the second set of TRS resource groups is a proper subset of the first set of TRS resource groups.

17. The method of item 15, wherein the TRS resources are grouped into a first number of groups forming the first set of TRS resource groups, and are grouped into a second number of groups forming the second set of TRS resource groups, the second number of groups being different from the first number of groups.

18. The method of item 15, wherein the first and second sets of TRS resource groups are configured by higher layer.

19. The method of item 18, wherein the first and second sets of TRS resource groups are configured based on a first group index (ID) and a second group ID.

20. The method of item 15, wherein the first set of TRS resource groups is configured by higher layer; and the TRS resources are regrouped into the second set of TRS resource groups by splitting TRS resource groups of the first set of TRS resource groups.

21. The method of item 20, the first set of TRS resource groups are split in ascending order of group ID until the number of groups is equal to a number of groups of the second set of TRS resource groups.

22. The method of item 20, wherein a group ID of each TRS resource group of the second set of TRS resource groups is determined at least by: a group ID of corresponding TRS resource group of the first set of TRS resource groups, a number of groups of the first set of TRS resource groups, and a number of groups of the second set of TRS resource groups.

23. The method of item 15, wherein the first set of TRS resource groups is configured by higher layer; and the TRS resources are regrouped into the second set of TRS resource groups by merging TRS resource groups of the first set of TRS resource groups.

24. The method of item 23, wherein TRS resource groups of the first set of TRS resource groups with group ID 1 and group ID 2 are merged upon satisfying the condition of:

$$\text{group } ID\ 1\%\ N = \text{group } ID\ 2\%\ N,$$

where N is a number of groups of the second set of TRS resource groups, and % represents modulo operation.

25. The method of item 23, wherein a group ID of a merged group of groups with group ID 1 and group ID 2 for the second set of TRS resource groups is determined at least based on the group ID1 and/or group ID2.

26. The method of item 15, wherein a TRS resource with state of availability indicated as available by a latest one of the transmitted first signaling and second signaling is determined as available.

27. The method of item 15, wherein a TRS resource with state of availability indicated as available by any one of the first signaling and second signaling is determined as available.

28. The method of item 15, wherein the first signaling is paging PDCCH based signaling with a first validity time; the second signaling is a PEI based signaling with a second validity time; and it is assumed that, within the first validity time, the PEI signaling contains no field of TRS availability indication.

In a further aspect, some items as examples of the disclosure concerning a UE or remote device may be summarized as follows:

29. An apparatus, comprising:

a receiver that receives a first signaling indicating states of availability of Tracking Reference Signal (TRS) resource groups in a first set of TRS resource groups; and a second signaling indicating states of availability of TRS resource groups in a second set of TRS resource groups; and a processor that determines availability of TRS resources based on the first signaling and the second signaling;

wherein each of the first signaling and the second signaling is one of: a paging Physical Downlink Control Channel (PDCCH) based signaling and a Paging Early Indication (PEI) based signaling.

30. The apparatus of item 29, wherein the second set of TRS resource groups is a proper subset of the first set of TRS resource groups.

31. The apparatus of item 29, wherein the TRS resources are grouped into a first number of groups forming the first set of TRS resource groups, and are grouped into a second number of groups forming the second set of TRS resource groups, the second number of groups being different from the first number of groups.

32. The apparatus of item 29, wherein the first and second sets of TRS resource groups are configured by higher layer.

33. The apparatus of item 32, wherein the first and second sets of TRS resource groups are configured based on a first group index (ID) and a second group ID.

34. The apparatus of item 29, wherein the first set of TRS resource groups is configured by higher layer; and the TRS resources are regrouped into the second set of TRS resource groups by splitting TRS resource groups of the first set of TRS resource groups.

35. The apparatus of item 34, the first set of TRS resource groups are split in ascending order of group ID until the number of groups is equal to a number of groups of the second set of TRS resource groups.

36. The apparatus of item 34, wherein a group ID of each TRS resource group of the second set of TRS resource groups is determined at least by: a group ID of corresponding TRS resource group of the first set of TRS resource groups, a number of groups of the first set of TRS resource groups, and a number of groups of the second set of TRS resource groups.

37. The apparatus of item 29, wherein the first set of TRS resource groups is configured by higher layer; and the TRS resources are regrouped into the second set of TRS resource groups by merging TRS resource groups of the first set of TRS resource groups.

38. The apparatus of item 37, wherein TRS resource groups of the first set of TRS resource groups with group ID 1 and group ID 2 are merged upon satisfying the condition of:

$$\text{group } ID\ 1\%\ N = \text{group } ID\ 2\%\ N,$$

where N is a number of groups of the second set of TRS resource groups, and % represents modulo operation.

39. The apparatus of item 37, wherein a group ID of a merged group of groups with group ID 1 and group ID 2 for the second set of TRS resource groups is determined at least based on the group ID1 and/or group ID2.

40. The apparatus of item 29, wherein a TRS resource with state of availability indicated as available by a latest one of the received first signaling and second signaling is determined as available.

41. The apparatus of item 29, wherein a TRS resource with state of availability indicated as available by any one of the first signaling and second signaling is determined as available.

42. The apparatus of item 29, wherein the first signaling is paging PDCCH based signaling with a first validity time; the second signaling is a PEI based signaling with a second validity time; and it is assumed that, within the first validity time, the PEI signaling contains no field of TRS availability indication.

In a yet further aspect, some items as examples of the disclosure concerning a NE or gNB may be summarized as follows:

43. An apparatus, comprising:

a transmitter that transmits a first signaling indicating states of availability of Tracking Reference Signal (TRS) resource groups in a first set of TRS resource groups; and a second signaling indicating states of availability of TRS resource groups in a second set of TRS resource groups; and a processor that determines availability of TRS resources based on the first signaling and the second signaling;

wherein each of the first signaling and the second signaling is one of: a paging Physical Downlink Control Channel (PDCCH) based signaling and a Paging Early Indication (PEI) based signaling.

44. The apparatus of item 43, wherein the second set of TRS resource groups is a proper subset of the first set of TRS resource groups.

45. The apparatus of item 43, wherein the TRS resources are grouped into a first number of groups forming the first set of TRS resource groups, and are grouped into a second number of groups forming the second set of TRS resource groups, the second number of groups being different from the first number of groups.

46. The apparatus of item 43, wherein the first and second sets of TRS resource groups are configured by higher layer.

47. The apparatus of item 46, wherein the first and second sets of TRS resource groups are configured based on a first group index (ID) and a second group ID.

48. The apparatus of item 43, wherein the first set of TRS resource groups is configured by higher layer; and the TRS resources are regrouped into the second set of TRS resource groups by splitting TRS resource groups of the first set of TRS resource groups.

49. The apparatus of item 48, the first set of TRS resource groups are split in ascending order of group ID until the number of groups is equal to a number of groups of the second set of TRS resource groups.

50. The apparatus of item 48, wherein a group ID of each TRS resource group of the second set of TRS resource groups is determined at least by: a group ID of corresponding TRS resource group of the first set of TRS resource groups, a number of groups of the first set of TRS resource groups, and a number of groups of the second set of TRS resource groups.

51. The apparatus of item 43, wherein the first set of TRS resource groups is configured by higher layer; and the TRS resources are regrouped into the second set of TRS resource groups by merging TRS resource groups of the first set of TRS resource groups.

52. The apparatus of item 51, wherein TRS resource groups of the first set of TRS resource groups with group ID 1 and group ID 2 are merged upon satisfying the condition of:

$$\text{group } ID\ 1\%\ N = \text{group } ID\ 2\%\ N,$$

where N is a number of groups of the second set of TRS resource groups, and % represents modulo operation.

53. The apparatus of item 51, wherein a group ID of a merged group of groups with group ID 1 and group ID 2 for the second set of TRS resource groups is determined at least based on the group ID1 and/or group ID2.

54. The apparatus of item 43, wherein a TRS resource with state of availability indicated as available by a latest one of the transmitted first signaling and second signaling is determined as available.

55. The apparatus of item 43, wherein a TRS resource with state of availability indicated as available by any one of the first signaling and second signaling is determined as available.

56. The apparatus of item 43, wherein the first signaling is paging PDCCH based signaling with a first validity time; the second signaling is a PEI based signaling with a second validity time; and it is assumed that, within the first validity time, the PEI signaling contains no field of TRS availability indication.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method performed by a user equipment (UE), the method comprising:

receiving a first signaling indicating states of availability of tracking reference signal (TRS) resource groups in a first set of TRS resource groups;

receiving a second signaling indicating states of availability of TRS resource groups in a second set of TRS resource groups; and determining an availability of TRS resources based on the first signaling and the second signaling, wherein each of the first signaling and the second signaling is one of a paging physical downlink control channel (PDCCH) based signaling or a paging early indication (PEI) based signaling, wherein the TRS resources are grouped into a first number of groups forming the first set of TRS resource groups, and are grouped into a second number of groups forming the second set of TRS resource groups, the second number of groups being different than the first number of groups.

2. The method of claim 1, wherein the second set of TRS resource groups is a proper subset of the first set of TRS resource groups.

3. The method of claim 1, wherein the first and second sets of TRS resource groups are configured by a higher layer.

4. A network equipment (NE) for wireless communication, comprising:

at least one memory; and at least one processor coupled with the at least one memory and configured to cause the NE to:

transmit a first signaling indicating states of availability of tracking reference signal (TRS) resource groups in a first set of TRS resource groups;

transmit a second signaling indicating states of availability of TRS resource groups in a second set of TRS resource groups; and determine an availability of TRS resources based on the first signaling and the second signaling, wherein each of the first signaling and the second signaling is one of a paging physical downlink control channel (PDCCH) based signaling or a paging early indication (PEI) based signaling, wherein the TRS resources are grouped into a first number of groups forming the first set of TRS resource groups, and are grouped into a second number of groups forming the second set of TRS resource groups, the second number of groups being different than the first number of groups.

5. A user equipment (UE) for wireless communication, comprising:

at least one memory; and at least one processor coupled with the at least one memory and configured to cause the UE to:

receive a first signaling indicating states of availability of tracking reference signal (TRS) resource groups in a first set of TRS resource groups;

receive a second signaling indicating states of availability of TRS resource groups in a second set of TRS resource groups; and determine an availability of TRS resources based on the first signaling and the second signaling, wherein each of the first signaling and the second signaling is one of a paging physical downlink control channel (PDCCH) based signaling or a paging early indication (PEI) based signaling, wherein the TRS resources are grouped into a first number of groups forming the first set of TRS resource groups, and are grouped into a second number of groups forming the second set of TRS resource groups, the second number of groups being different than the first number of groups.

6. The UE of claim 5, wherein the second set of TRS resource groups is a proper subset of the first set of TRS resource groups.

7. The UE of claim 5, wherein the first set of TRS resource groups and the second set of TRS resource groups are configured by a higher layer.

8. The UE of claim 7, wherein the first set of TRS resource groups and the second set of TRS resource groups are configured based on a first group index and a second group index.

9. The UE of claim 5, wherein:

the first set of TRS resource groups is configured by a higher layer; and the TRS resources are regrouped into the second set of TRS resource groups by splitting the TRS resource groups in the first set of TRS resource groups.

10. The UE of claim 9, wherein the first set of TRS resource groups are split in ascending order of group index until a number of groups is equal to a number of TRS resource groups in the second set of TRS resource groups.

11. The UE of claim 9, wherein a group index of each TRS resource group in the second set of TRS resource groups is determined at least by a group index of corresponding TRS resource groups in the first set of TRS resource groups, a number of groups of the first set of TRS resource groups, and a number of groups of the second set of TRS resource groups.

12. The UE of claim 5, wherein:

the first set of TRS resource groups is configured by a higher layer; and the TRS resources are regrouped into the second set of TRS resource groups by merging the TRS resource groups of the first set of TRS resource groups.

13. The UE of claim 12, wherein the TRS resource groups in the first set of TRS resource groups with a group index 1 and a group index 2 are merged based on a condition of group index 1% N=group index 2% N, wherein the N is a number of groups of the second set of TRS resource groups, and the % represents a modulo operation.

14. The UE of claim 12, wherein a group index of a merged group of groups with a group index 1 and a group index 2 for the second set of the TRS resource groups is determined based on at least one of the group index 1 or the group index 2.

15. The UE of claim 5, wherein a TRS resource with a state of availability indicated as available by a latest one of the first signaling or the second signaling is determined as available.

16. The UE of claim 5, wherein a TRS resource with a state of availability indicated as available by either one of the first signaling or the second signaling is determined as available.

17. The UE of claim 5, wherein:

the first signaling is paging PDCCH based signaling with a first validity time;

the second signaling is a PEI based signaling with a second validity time; and within the first validity time, the PEI based signaling contains no field of TRS availability indication.

18. A processor for wireless communication, comprising:

at least one controller coupled with at least one memory and configured to cause the processor to:

receive a first signaling indicating states of availability of tracking reference signal (TRS) resource groups in a first set of TRS resource groups;

receive a second signaling indicating states of availability of TRS resource groups in a second set of TRS resource groups; and determine an availability of TRS resources based on the first signaling and the second signaling, wherein each of the first signaling and the second signaling is one of a paging physical downlink control channel (PDCCH) based signaling or a paging early indication (PEI) based signaling, wherein the TRS resources are grouped into a first number of groups forming the first set of TRS resource groups, and are grouped into a second number of groups forming the second set of TRS resource groups, the second number of groups being different than the first number of groups.

19. The processor of claim 18, wherein:

the first set of TRS resource groups is configured by a higher layer; and the TRS resources are regrouped into the second set of TRS resource groups by splitting the TRS resource groups in the first set of TRS resource groups.

20. The processor of claim 18, wherein:

the first set of TRS resource groups is configured by a higher layer; and the TRS resources are regrouped into the second set of TRS resource groups by merging the TRS resource groups of the first set of TRS resource groups.

* * * * *